Patented Aug. 8, 1933

1,921,299

UNITED STATES PATENT OFFICE 1,921,299

CYANIDE AND METHOD OF CONTROLLING THE POROSITY THEREOF

Vartkes Migrdichian, Elizabeth, N. J., assignor to American Cyanamid Company, New York, N. Y., a Corporation of Maine No Drawing. Application March 12, 1929
Serial No. 346,501

6 Claims. (Cl. 23—79)

This invention relates to a method of preparing a cyanide such as crude calcium cyanide, with any desired degree of porosity or density, and to the product thus produced.

The patent to Walter S. Landis No. 1,359,257 discloses a method of preparing crude calcium cyanide by reacting together calcium cyanamid, common salt and calcium carbide, in an electric furnace. The product, to wit: principally calcium cyanide with minor amounts of sodium chloride, calcium oxide, graphite, calcium cyanamide and other impurities, is produced almost continuously as a result of this reaction in a fused condition and this fused salt is then cooled to below 400° C.

A suitable apparatus for cooling the same is shown and described in the patent to George E. Cox No. 1,649,511 which consists essentially of a cooling or chilling wheel which takes the fused crude cyanide from the production furnace in strata of varying thicknesses upon its cooled periphery so as to produce lumps or flakes upon chilling.

The present invention is based primarily upon the discovery that the degree of density or porosity of the resultant product may be controlled by the rate of cooling or chilling of the fused product, and this is dependent upon the rate at which the cooling medium is supplied, or the thickness of the strata being chilled, or both.

A microscopic examination of calcium cyanide prepared as above outlined discloses the fact that the thicker the strata being chilled or the slower the rate of cooling, the greater the number of gas pockets that will exist in the finished product. Obviously, an apparatus adjusted to deliver a certain quantity of cooling medium to the chilling device will produce various rates of cooling, dependent entirely upon the thickness of the strata being cooled. Thus the rate of cooling may be changed either by treating thinner or thicker strata of molten material or by adjusting the rate of flow of cooling medium.

This change in porosity or density is probably due to the fact that the fused material while in that condition, undergoes a decomposition, so that a quantity of entrapped gas in small or minute bubbles is produced, and if the stratum is chilled quickly and substantially throughout its depth so as to set the cyanide, these minute bubbles do not have time to agglomerate, or else do not form at all, with the result that the final solid material does not contain gas pockets of any appreciable or material size. At any rate, it has been clearly demonstrated that if a stratum of crude fused cyanide is chilled quickly and throughout, a much denser product, substantially free from gas cavities, is produced, than if a state of plastic fusion is maintained either by slowing up the rate of flow of cooling medium or by thickening the strata to be cooled.

There is a considerable difference in the specific gravity of the dense and porous cyanide produced according to this invention, and it has been possible to produce a crude calcium cyanide as above outlined in flakes less than 0.045" in thickness in which the specific gravity was greater than 1.7903. Flakes 0.030" in thickness have been produced in which the specific gravity was as high as 1.8931, so that by regulating the process as herein described a cyanide may be produced over a wide range of specific gravities.

Crude calcium cyanide specifically has a number of very important uses in which it is desirable to use a porous product. One of these uses is the generation of hydrocyanic acid gas therefrom by the action thereon of moist air. Obviously, the more porous the product the greater the ease of hydrocyanic acid evolution. My experiments have conclusively demonstrated that utilizing a uniform rate of flow of moist air over granules of calcium cyanide prepared from flakes of certain thickness produce a greater generation of hydrocyanic acid gas than granules of the same size produced from cyanide of a lesser thickness, where substantially the same cooling procedure obtained. Consequently, by prolonging the cooling period, either by decreasing the rate of flow of cooling medium or by increasing the thickness of the fused material and hence maintaining a period of plastic fusion for a longer length of time, one may produce a high degree of porosity.

On the other hand, where a cyanide is to be used other than for the generation of hydrocyanic acid gas from the reaction with moist air, and a more stable product is desired, the dense variety will be preferable. Thus, a product containing substantially no, or a minimum quantity of, gas pockets of appreciable size, may be shipped or exposed to the air for long periods of time without material decomposition. The fact that such a product is of a greater specific gravity than the porous variety likewise permits the packing of a given quantity thereof in a materially less volume.

While I have described the preparation of a cyanide substantially free from gas cavities throughout, yet obviously by so treating the molten product as to produce a substantial thickness or crust thereon free from gas pockets, this dense crust will of itself prevent undue decomposition of the interior of the flakes or lumps during shipment or until used.

Obviously, this discovery is equally applicable to cyanides other than calcium cyanide, and it is to be understood that the invention is considered to cover any like salt produced in a state of fusion in which the cooling is so regulated and controlled as to determine the size and quantity of gas pockets in the resultant product.

It may be desirable under some circumstances to convert a cyanide or other salt already produced into a porous or denser form, and this may be done by fusing the already produced salt and continuing the treatment from that point.

It is impossible to state precisely the exact rate of cooling or thickness of strata desired as this will be dependent upon the degree of porosity or density required. Obviously, with the disclosure that this may be varied at will by the rate of cooling or the thickness of strata, or both, anyone skilled in this art will be enabled to so regulate the process for himself as to produce the results desired.

What I claim is:

1. A dense crude calcium cyanide having a specific gravity greater than 1.7903.

2. A cyanide having a crust thereon substantially free from gas cavities.

3. A method of preparing a porous cyanide which includes the steps of producing the fused salt and then slowly cooling the same at such a rate that the resultant product contains gas pockets of substantial size.

4. A method of preparing porous cyanide which includes the steps of producing a fused salt, and then slowly cooling the same in a stratum of such thickness that the resultant product will contain gas pockets of substantial size.

5. A method of preparing a porous cyanide which includes the steps of producing a fused salt, and then maintaining a state of plastic fusion for a period sufficient to produce gas pockets of substantial size in the resultant product.

6. A porous flake cyanide containing gas cavities of substantial size throughout.

VARTKES MIGRDICHIAN.